Jan. 16, 1934.                    G. A. VAN VOORST                    1,943,776
MILK RECEPTACLE
Filed Feb. 18, 1932                                  2 Sheets-Sheet 1
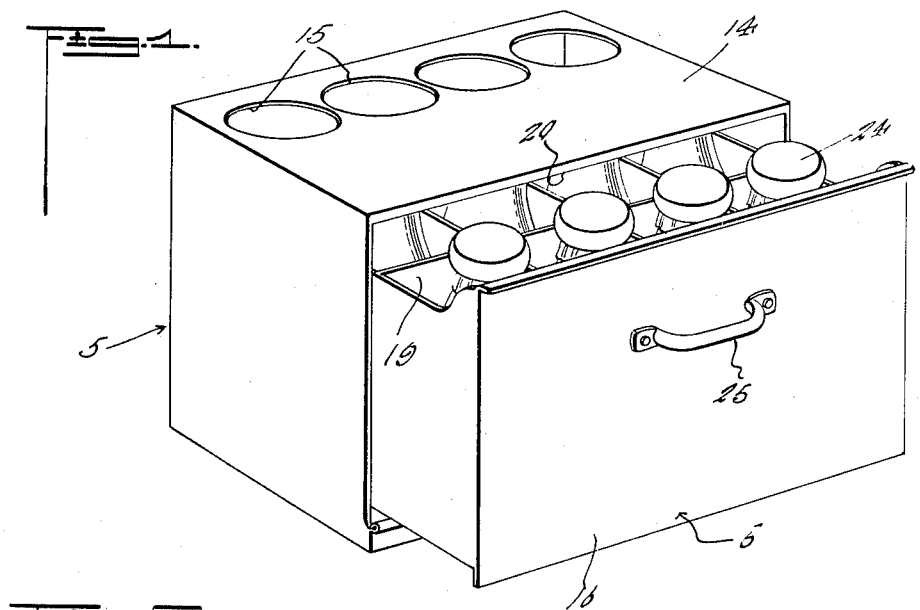
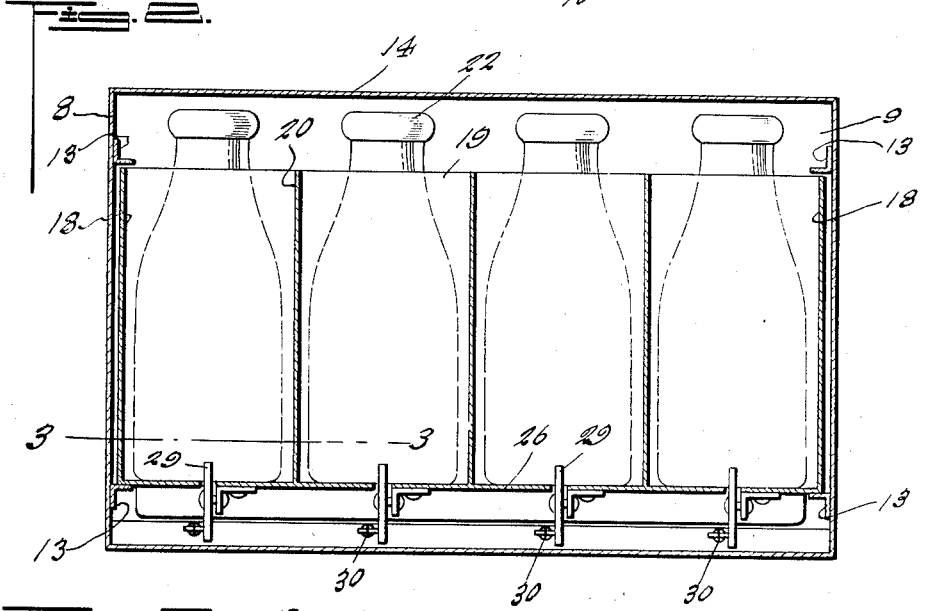
Inventor
GERRIT A. VAN VOORST.
By Clarence A. O'Brien
Attorney

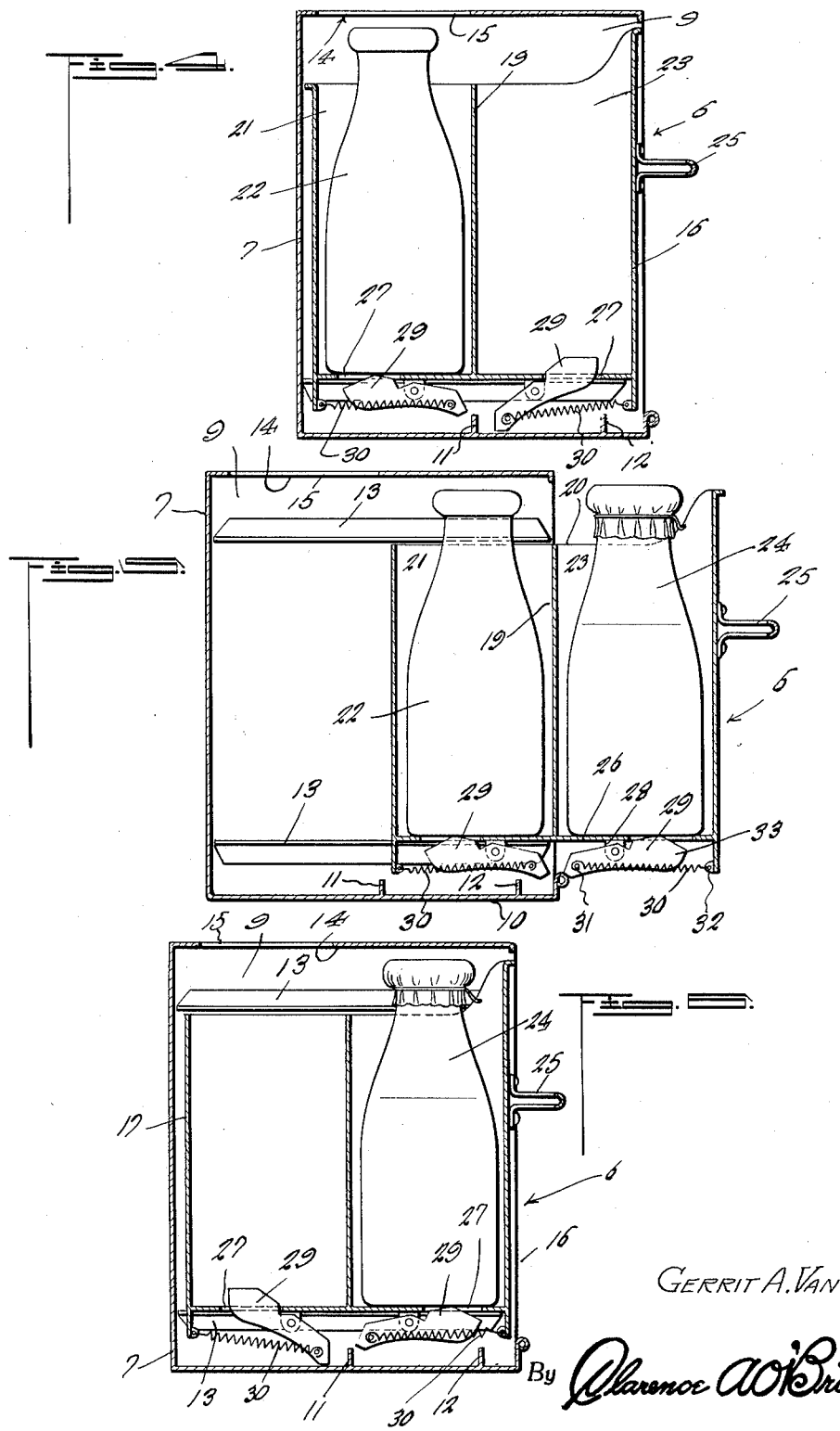

UNITED STATES PATENT OFFICE 1,943,776

MILK RECEPTACLE

Gerrit Andrew Van Voorst, Steen, Minn.

Application February 18, 1932. Serial No. 593,840

1 Claim. (Cl. 232—41)

This invention appertains to new and useful improvements in deposit receptacles, and more particularly to a receptacle for milk bottles.

The principal object of this invention is to provide a milk bottle receptacle for domestic use, wherein means is provided requiring the deposit of an empty bottle before a full bottle can be extracted.

Another important object of the invention is to provide a receptacle which will eliminate theft of milk and furnish a convenient and sanitary means for accommodating both empty and full milk bottles.

These and other important objects and advantages of the invention will become apparent to the reader of the following specification.

In the drawings:

Figure 1 represents a perspective view of the receptacle in open position.

Fig. 2 represents a vertical longitudinal view through the receptacle.

Fig. 3 represents a fragmentary detailed sectional view taken substantially on line 3—3 of Fig. 2.

Fig. 4 represents a transverse vertical sectional view showing the receptacle with an empty bottle inserted.

Fig. 5 represents a vertical transverse sectional view showing the receptacle in partially open position with both empty and full bottles therein.

Fig. 6 represents a vertical transverse sectional view showing the receptacle closed and having full milk bottles therein before empty bottles have been inserted to release the carrier.

Referring to the drawings wherein like numerals designate like parts, it can be seen, that the receptacle consists of a housing generally referred to by numeral 5 and a bottle carrier generally referred to by numeral 6. The housing 5 consists of the rear wall 7 the side walls 8 and 9, and the bottom wall 10, the bottom wall being provided with a pair of longitudinally extending ribs 11 and 12 thereon.

Each side wall 8 and 9 is provided with a pair of vertically spaced guides 13—13 for slidably supporting the carrier generally referred to by numeral 6.

Numeral 14 represents the top for the housing 5 and this top has a plurality of openings 15 therein through which milk bottles can be inserted for disposition in the carrier 6.

The carrier 6 consists of the front wall 16 and the shorter rear wall 17 connected by the side walls 18—18. Interposed between the side walls 18—18 is the longitudinally extending partition 19, while extending between the longitudinal partition 19 and the front and rear walls 16 and 17 respectively are the transverse partitions 20, the partitions on one side of the partition 19 defining compartments 21 for empty milk bottles 22, while the compartments on the other side of the partition 19 denoted by numeral 23 are for the full milk bottles 24.

The front wall 16 has a handle 25 thereon, and the bottom 26 of the carrier 6 is provided with a short slot 27 underlying each compartment 21 and 23. On the bottom side of the bottom 26 beneath each compartment 21 and 23 are the ears 28 for rockably supporting a catch member 29 which has a spring 30 interposed between one end thereof as at 31 and an ear 32 on the carrier whereby the end portion 33 of the member 29 is maintained tensionally projected through the corresponding slot 27 as in the manner shown in the compartment 23 in Fig. 4 of the accompanying drawings.

When the carrier 6 is located in the housing 5, the rockable members 29 underlying the compartments 21 will be located between the rib 11 and the rear wall 7, while the rockable members 29 underlying the compartments 21 will be located in overlying position to the space between the ribs 11 and 12.

It will be observed that the members 29 underlying the different compartments 21 and 23 are tensioned to swing in opposite directions, so that when the compartments 21 are empty the associated members 29 will abut the rib 11, to prevent removal of the carrier 6.

In operation, the housekeeper inserts empty milk bottles into the compartment 21 through the opening 15. The weight of the milk bottle 22 upon the rockable members 29 will raise the same out of the path of the ribs 11 and 12, so that the carrier 6 can be substantially withdrawn from the housing 5. Full milk bottles can now be inserted in the compartment 23 and the empty bottles can be removed from the compartment 21. With the empty bottles removed and the full bottles positioned in the compartment 23, when the carrier is returned to the position shown in Fig. 6, the rockable members 29 underlying the compartment 21 will engage behind the ribs 11 and hold the carrier against outward movement so that the full milk bottles cannot be removed from the receptacle until the rockable members 29 are disengaged from the ribs 11 by inserting empty bottles or the like through the openings 15 and into the compartments 21 for rest upon the underlying rockable members 29.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

A milk bottle deposit receptacle comprising a housing including top, bottom, rear and side walls and having an open front, said top wall being provided with an opening, a drawer-like carrier slidably mounted in said housing and substantially filling the interior thereof, said carrier having a compartment for empty bottles and a second compartment for full bottles, said carrier being substantially withdrawable from said housing through the open front thereof to expose and provide access to said first and second-named bottle compartment, said empty bottle compartment registering with the opening in the top wall of said housing when said carrier is positioned in said housing, the bottom wall of said housing being provided with a longitudinal rib, and swingable latch means carried by the bottom of said carrier and engageable with said rib for normally holding said carrier against withdrawal from said housing, said latch means being swingable to an inoperative position upon the insertion of an empty bottle into said empty bottle compartment through the opening in the top wall of said housing to permit said carrier to be substantially withdrawn from said housing.

GERRIT ANDREW VAN VOORST.